US011731275B2

(12) United States Patent
Ohno

(10) Patent No.: US 11,731,275 B2
(45) Date of Patent: Aug. 22, 2023

(54) ROBOT CONTROL SYSTEM, ROBOT CONTROL METHOD, AND COMPUTER-READABLE STORAGE MEDIUM

(71) Applicant: TOYOTA JIDOSHA KABUSHIKI KAISHA, Toyota (JP)

(72) Inventor: Satoru Ohno, Aichi-ken (JP)

(73) Assignee: TOYOTA JIDOSHA KABICHIKI KAISHA, Toyota (JP)

(*) Notice: Subject to any disclaimer, the term of this patent is extended or adjusted under 35 U.S.C. 154(b) by 254 days.

(21) Appl. No.: 17/243,883

(22) Filed: Apr. 29, 2021

(65) Prior Publication Data

US 2021/0387342 A1 Dec. 16, 2021

(30) Foreign Application Priority Data

Jun. 11, 2020 (JP) ................................ 2020-101627

(51) Int. Cl.
*B25J 9/16* (2006.01)
*B25J 13/08* (2006.01)

(52) U.S. Cl.
CPC ........... *B25J 9/1669* (2013.01); *B25J 9/1687* (2013.01); *B25J 9/1697* (2013.01); *B25J 13/08* (2013.01)

(58) Field of Classification Search
CPC ...... B25J 9/1669; B25J 9/1687; B25J 9/1697; B25J 13/08; B25J 9/1612; B25J 9/1664; G05B 2219/45091
See application file for complete search history.

(56) References Cited

U.S. PATENT DOCUMENTS

| | | | | |
|---|---|---|---|---|
| 6,481,083 | B1 * | 11/2002 | Lawson | B25J 9/1664 29/714 |
| 2015/0119214 | A1 * | 4/2015 | Sasaki | B23Q 3/16 483/1 |
| 2015/0306716 | A1 * | 10/2015 | Neumeier | B25J 9/1687 29/714 |
| 2016/0078583 | A1 * | 3/2016 | Nishitani | H04N 23/661 348/207.1 |
| 2017/0205798 | A1 * | 7/2017 | Ishii | B25J 11/005 |
| 2018/0215038 | A1 * | 8/2018 | Ueda | B25J 9/1633 |
| 2020/0017317 | A1 * | 1/2020 | Yap | B65G 1/1376 |
| 2021/0044069 | A1 * | 2/2021 | Hoffmann | G06V 10/751 |

FOREIGN PATENT DOCUMENTS

| | | | |
|---|---|---|---|
| JP | 2003-225837 | A | 8/2003 |
| JP | 2015-080843 | A | 4/2015 |
| JP | 6500328 | B2 | 4/2019 |
| WO | WO-2021207861 | A1 * | 10/2021 |

* cited by examiner

*Primary Examiner* — Adam R Mott
*Assistant Examiner* — Sagar Kc
(74) *Attorney, Agent, or Firm* — Sughrue Mion, PLLC

(57) ABSTRACT

A robot control system includes a robot that screw-fastens a sub-component placed in a main-component to the main-component, a robot control unit that controls the robot, and a display as an output unit through which the robot control unit outputs a message to an operator. The robot control unit determines whether or not the robot can screw-fasten the sub-component to the main-component by itself. Then, when the robot control unit determines that the robot cannot screw-fasten the sub-component to the main-component by itself, the robot control unit outputs a cooperation message to an operator through the display.

7 Claims, 12 Drawing Sheets

23a

| FEATURE VECTOR | COMPONENT No. |
| --- | --- |
| a | 8044210 |
| b | 8044211 |
| c | 8044212 |
| d | 8044213 |
| e | 8044214 |
| f | 8044215 |

COMPONENT No. 8044214 FASTENING CONDITION TABLE

| No. | COORDINATE AND PERMISSIBLE RANGE | TORQUE | CONDI-TION |
|---|---|---|---|
| 1 | X:1 (0. 1) Y:1 (0. 1) Z:1 (0. 1) | 30Nm | NORMAL |
| 2 | X:2 (0. 1) Y:1 (0. 1) Z:1 (0. 1) | 30Nm | ROTATION |
| 3 | X:3 (0. 1) Y:1 (0. 1) Z:1 (0. 1) | 30Nm | ROTATION |
| 4 | X:1 (0. 1) Y:2 (0. 1) Z:0 (0. 1) | 30Nm | NORMAL |
| 5 | X:2 (0. 1) Y:2 (0. 1) Z:0 (0. 1) | 30Nm | JOINT FASTENING |
| 6 | X:3 (0. 1) Y:2 (0. 1) Z:0 (0. 1) | 30Nm | NORMAL |

COMPONENT No. 8044214 FASTENING RESULT TABLE

| No. | COORDINATE | TORQUE | SUCCESS/ FAILURE |
| --- | --- | --- | --- |
| 1 | X:1.02 Y:1.04 Z:0.97 | 39.7 Nm | SUCCESS |
| 2 | X:1.97 Y:1.02 Z:1.08 | 31.2 Nm | SUCCESS |
| 3 | X:3.10 Y:0.99 Z:1.03 | 37.9 Nm | SUCCESS |
| 4 | X:1.00 Y:2.09 Z:0.07 | 35.7 Nm | SUCCESS |
| 5 | X:2.05 Y:1.96 Z:-0.02 | 31.0 Nm | SUCCESS |
| 6 | X:2.91 Y:2.01 Z:0.10 | 37.7 Nm | SUCCESS |

Fig. 5

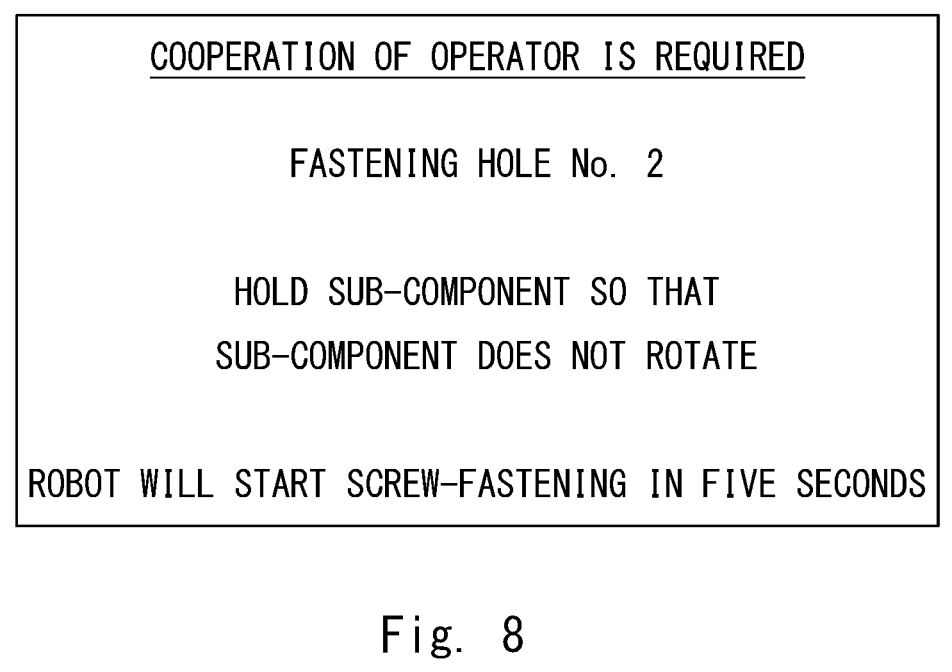

COOPERATION OF OPERATOR IS REQUIRED

FASTENING HOLE No. 2

HOLD SUB-COMPONENT SO THAT
SUB-COMPONENT DOES NOT ROTATE

ROBOT WILL START SCREW-FASTENING IN FIVE SECONDS

Fig. 8

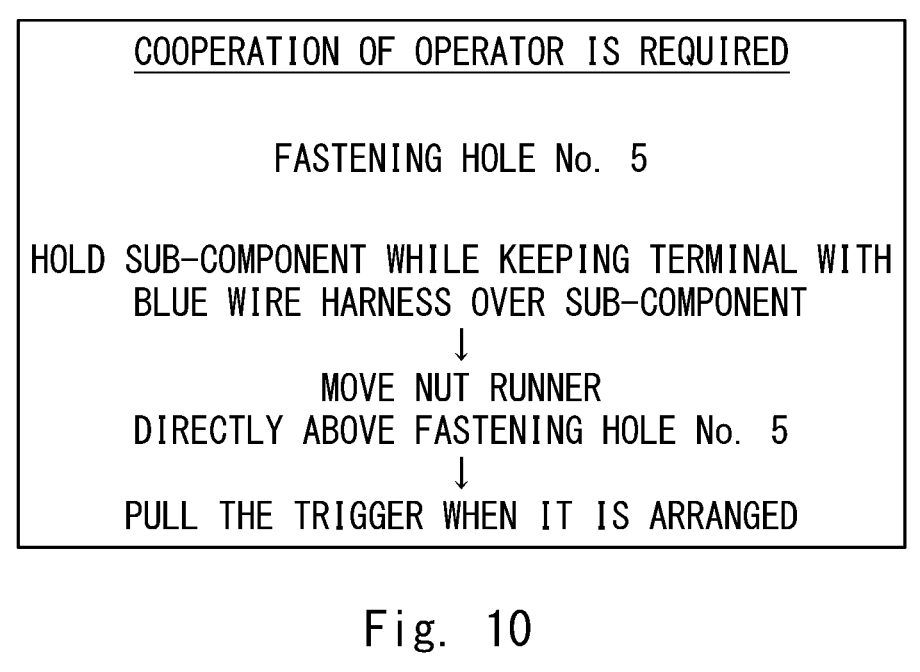

COOPERATION OF OPERATOR IS REQUIRED

FASTENING HOLE No. 5

HOLD SUB-COMPONENT WHILE KEEPING TERMINAL WITH BLUE WIRE HARNESS OVER SUB-COMPONENT
↓
MOVE NUT RUNNER DIRECTLY ABOVE FASTENING HOLE No. 5
↓
PULL THE TRIGGER WHEN IT IS ARRANGED

Fig. 10

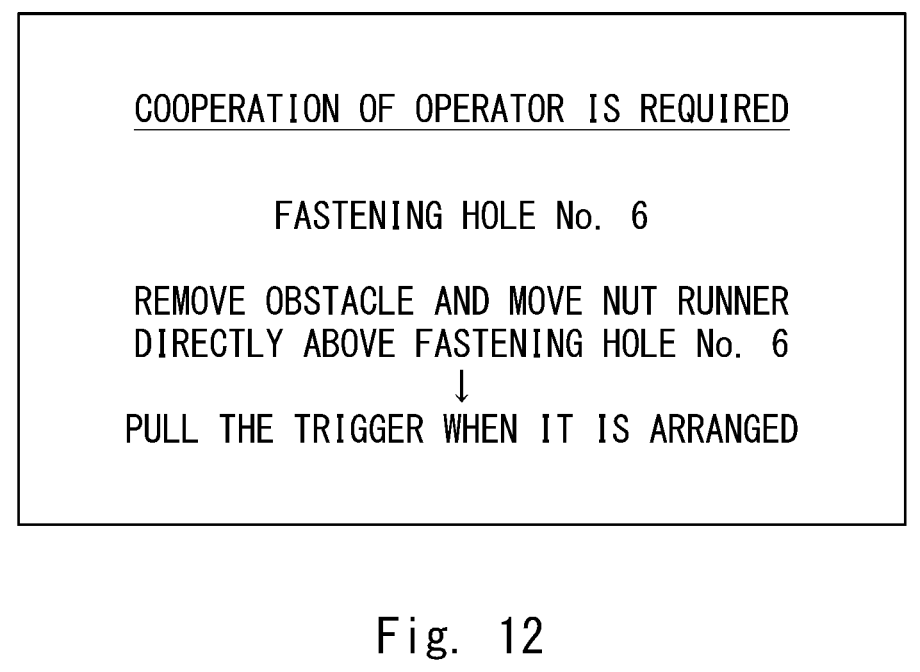

COOPERATION OF OPERATOR IS REQUIRED

FASTENING HOLE No. 6

REMOVE OBSTACLE AND MOVE NUT RUNNER
DIRECTLY ABOVE FASTENING HOLE No. 6
↓
PULL THE TRIGGER WHEN IT IS ARRANGED

Fig. 12

ROBOT CONTROL SYSTEM, ROBOT CONTROL METHOD, AND COMPUTER-READABLE STORAGE MEDIUM

CROSS REFERENCE TO RELATED APPLICATIONS

This application is based upon and claims the benefit of priority from Japanese patent application No. 2020-101627, filed on Jun. 11, 2020, the disclosure of which is incorporated herein in its entirety by reference.

BACKGROUND

The present disclosure relates to a robot control system, a robot control method, and a program.

Patent Literature 1 (Japanese Unexamined Patent Application Publication No. 2015-80843) discloses a robot that inserts a bolt into a through-hole formed in a jig and screws the bolt into a threaded hole formed in a workpiece in order to fix the jig to the workpiece. This robot is configured to determine a workpiece for which the fastening itself has not been properly carried out as a defective item and convey that workpiece to a defective-item collecting place.

SUMMARY

Nowadays, robots are useful, in particular, for tasks of fastening components using screws (hereinafter also described as screw-fastening tasks) because they can move exactly in accordance with the set movement. However, naturally, such robots have strong points (i.e., tasks they are good at) and weak points (i.e., tasks they are not good at), so it is not always possible for them to perform all the screw-fastening tasks by themselves.

An object of the present disclosure is to provide a technique for complementing a robot that performs a screw-fastening task for its strong point and weak point.

A first exemplary aspect is a robot control system including: a robot configured to screw-fasten a second component disposed in a first component to the first component; a robot control unit configured to control the robot; and an output unit through which the robot control unit outputs a message to an operator, in which the robot control unit determines whether or not the robot is able to screw-fasten the second component to the first component by itself, when the robot control unit determines that the robot is not able to screw-fasten the second component to the first component by itself, the robot control unit outputs a cooperation message to the operator through the output unit, and when the robot control unit determines that the robot is able to screw-fasten the second component to the first component by itself, the robot control unit controls, without outputting the cooperation message, the robot so that the robot screw-fastens the second component to the first component by itself. According to the above-described configuration, the robot, which performs the screw-fastening task, is complemented for its strong points and weak points.

The robot control unit preferably determines that the robot is not able to screw-fasten the second component to the first component by itself when the second component rotates relative to the first component as the robot tries to screw-fasten the second component to the first component by itself. According to the above-described configuration, when the second component rotates relative to the first component as the robot tries to screw-fasten the second component to the first component by itself, the cooperation message is output.

The cooperation message is preferably a message instructing the operator to hold, when the robot screw-fastens the second component to the first component, the second component so that the second component does not rotate relative to the first component. According to the above-described configuration, a cooperation message that can be easily understood is realized (e.g., created and issued).

The robot control unit preferably determines that the robot is not able to screw-fasten the second component to the first component by itself when the second component is a component that needs to be screw-fastened to the first component in a state in which the component and another component are stacked on each other. According to the above-described configuration, when the second component is a component that needs to be screw-fastened to the first component in a state in which the component and another component are stacked on each other, the cooperation message is output.

The cooperation message is preferably a message instructing the operator to hold, when the robot screw-fastens the second component to the first component, the second component and the other component so that the second component is kept in the state in which the second component and the other component are stacked on each other. According to the above-described configuration, a cooperation message that can be easily understood is realized (e.g., issued).

One of the second component and the other component is preferably a terminal.

The robot preferably includes a nut runner and a robot arm configured to support the nut runner. The robot control system preferably further includes a camera configured to take an image of a working environment around the robot. The robot control unit preferably calculates a moving path of the nut runner along which the nut runner moves when the second component is screw-fastened to the first component. The robot control unit preferably determines whether or not there is an obstacle in the moving path based on an image output from the camera. When the robot control unit determines that there is an obstacle in the moving path, the robot control unit preferably determines that the robot is not able to screw-fasten the second component to the first component by itself. According to the above-described configuration, when the robot control unit determines that there is an obstacle in the moving path, the cooperation message is output.

The cooperation message is preferably a message instructing the operator to remove the obstacle and to move the nut runner to a place suitable for the robot to screw-fasten the second component to the first component. According to the above-described configuration, a cooperation message that can be easily understood is realized.

The obstacle is preferably a wire harness.

Another exemplary aspect is a robot control method for controlling a robot configured to screw-fasten a second component disposed in a first component to the first component, the root control method including: determining whether or not the robot is able to screw-fasten the second component to the first component by itself; outputting, when it is determined that the robot is not able to screw-fasten the second component to the first component by itself, a cooperation message to an operator; and when it is determined that the robot is able to screw-fasten the second component to the first component by itself, controlling, without outputting the cooperation message, the robot so that the robot screw-fastens the second component to the first component by itself. According to the above method, the robot, which performs the screw-fastening task, is complemented for its strong points and weak points.

Another exemplary aspect is a program for causing a computer to perform the above-described robot control method.

According to the present disclosure, the robot, which performs the screw-fastening task, is complemented for its strong points and weak points.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 shows an example of component identification information;

FIG. 4 shows an example of fastening condition information;

FIG. 5 shows an example of fastening result information;

FIG. 8 shows an example of an image displayed on a display;

FIG. 10 shows an example of an image displayed on a display;

FIG. 12 shows an example of an image displayed on a display.

DESCRIPTION OF EMBODIMENTS

Figure 1:
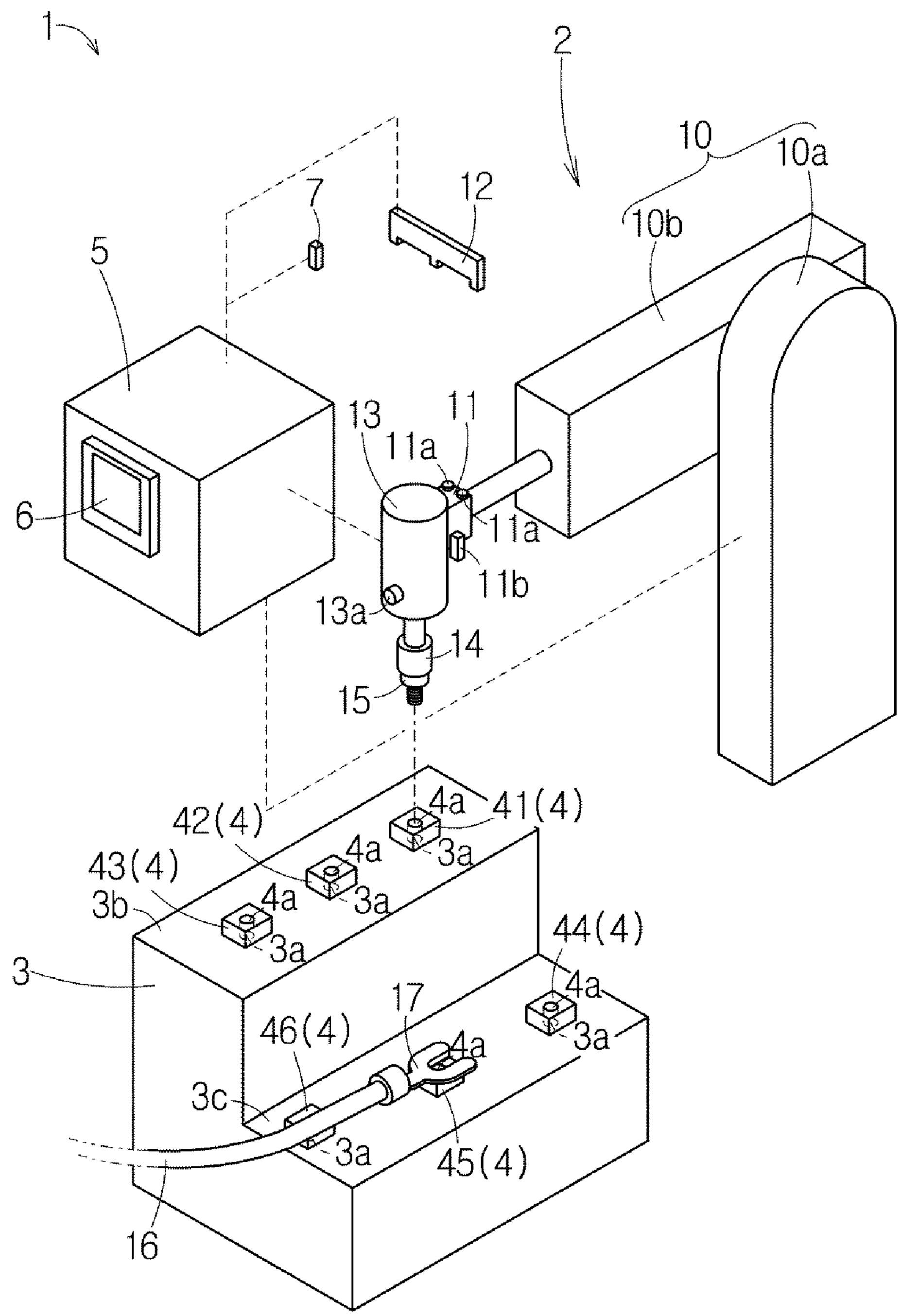
FIG. 1 is an overall schematic diagram of a robotic control system.

A robot control system 1 will be described hereinafter with reference to FIGS. 1 to 12. The robot control system 1 is a system for attaching a plurality of sub-components 4 to a main-component 3 by screw fastening (i.e., fastening using screws) by using a robot 2. In the robot control system 1 according to this embodiment, for each of the sub-components 4, when the robot 2 can screw-fasten that sub-component 4 to the main-component 3 by itself, the robot 2 fastens the sub-component 4 to the main-component 3 by itself, whereas when the robot 2 cannot screw-fasten the sub-component 4 to the main-component 3 by itself, the robot 2 requests cooperation from an operator and screw-fastens the sub-component 4 to the main-component 3 in cooperation with the operator.

The case where the robot 2 cannot screw-fasten the sub-component 4 to the main-component 3 by itself is, for example, a case where, in a state in which the sub-component 4 is disposed in the main-component 3, the sub-component 4 rotates relative to the main-component 3 as the robot 2 tries to screw-fasten the sub-component 4 to the main-component 3, a case where the sub-component 4 needs to be screw-fastened to the main-component 3 together with another component in a state in which the sub-component 4 and the other component are stacked on each other, or a case where the task itself performed by the robot 2 is restricted due to the presence of an obstacle in the working environment around the robot 2.

The robot control system is configured so that when the robot 2 cannot screw-fasten the sub-component 4 by itself as described above, the robot 2 requests cooperation from an operator and then the robot 2 screw-fastens the sub-component 4 in cooperation with the operator. In this way, the robot 2, which performs the screw-fastening task, has its strong points and weak points complemented, and the quality of the screw fastening itself is improved, so that it is expected that the robot control system contributes to the improvement of the yield rate.

FIG. 1 shows an overall schematic diagram of the robot control system 1.

As shown in FIG. 1, the robot control system 1 includes the robot 2, a robot control unit 5, and a display 6 as an output unit. The robot control system 1 further includes a ceiling camera 7 as a camera.

The main-component 3 is, for example, a bracket or a casing. Each of the sub-components 4 is typically smaller than the main-component 3 and is used to add various functions to the main-component 3 or complement various functions of the main-component 3. Examples of the sub-components 4 include a wire harness and various movable components. Each of the sub-components 4 is attached to the main-component 3 by screw fastening (i.e., fastening using a screw(s)).

The robot 2 includes a robot arm unit 10, a chuck 11, and a triple camera 12. The robot arm unit 10 is, for example, a six-axis articulated arm. The robot arm unit 10 includes a base **10*a* and an arm 10*b* that can rotate relative to the base 10*a*. The chuck 11 is disposed at the tip of the arm 10*b***.

The chuck 11 holds one of a plurality of nut runners 13 having specifications different from each other, such as different maximum rotation speed and different maximum output torques, in an attachable/detachable manner. A plurality of markers **11*a* are provided on the upper surface of the chuck 11. Each of the markers 11*a* is typically made of a material that reflects infrared light. The triple camera 12 applies infrared light to the plurality of markers 11*a* and receives infrared light reflected on the plurality of markers 11*a*. In this way, it is possible to detect the position of the tip of a socket 14 attached to the nut runner 13**.

Note that the position of the tip of the socket 14 may be calculated from an encoder value of each of the axes of the robot arm unit 10, instead of being detected by using the above-described markers **11*a* and the triple camera 12**.

In the chuck 11, a fastening-hole recognition camera **11*b* that takes image of a plurality of fastening holes 3*a* formed in the main-component 3 and fastening holes 4*a* formed in respective sub-components 4** is provided.

The nut runner 13 holds the bolt-fastening socket 14 in an attachable/detachable manner, and rotates the socket 14 at a desired rotation speed and a desired torque. The socket 14 holds a bolt 15.

In the nut runner 13, a trigger **13*a*** that the operator can operate is provided.

The ceiling camera 7 takes an image of the working environment around the robot 2. Specifically, the ceiling camera 7 takes an image of the moving range of the nut runner 13. The ceiling camera 7 can take an overall image of the main-component 3.

Note that, as shown in FIG. 1, for example, six sub-components 4 are attached to the main-component 3 by screw fastening. For the sake of explanation, the six sub-components 4 are also referred to as sub-components 41, 42, 43, 44, 45 and 46. The sub-components 41, 42 and 43 are arranged on an upper-stage surface **3*b* of the main-component 3, and the sub-components 44, 45 and 46 are arranged on a lower-stage surface 3***c* of the main-component 3. In FIG. 1, none of the sub-components 4 has been attached yet to the main-component 3 by screw fastening. That is, FIG. 1 shows a state in which the sub-components 4 have been simply placed at attaching positions in the main-component 3 by the operator. As shown in FIG. 1, the sub-component 45 is screw-fastened to the main-component 3 together with a Y-shaped crimp terminal 17 of a wire harness 16. Note that the shape of the main-component 3, the number of the sub-components 4, and the attaching positions of the sub-components 4 are merely examples, and are not intended to limit the technical interpretation of the present disclosure.

Figure 2:
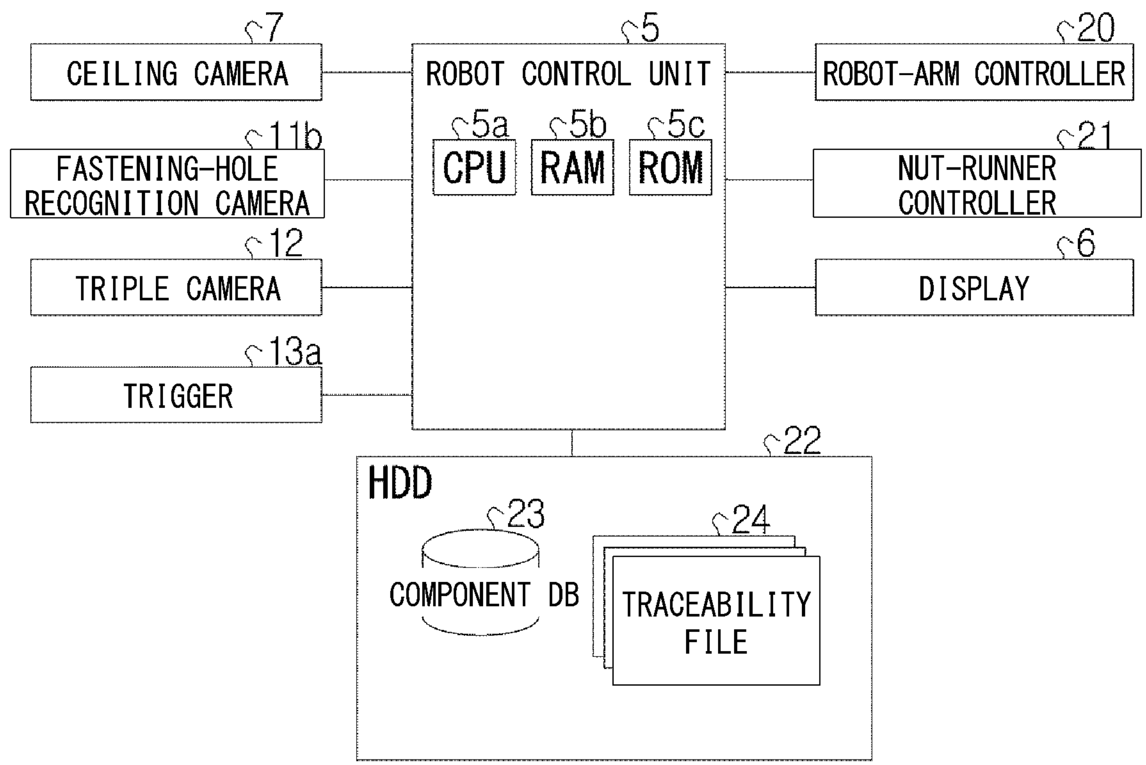
FIG. 2 is a functional block diagram of the robot control system.

FIG. 2 is a functional block diagram of the robot control system 1. As shown in FIG. 2, the robot control unit 5 includes a CPU (Central Processing Unit) 5*a* as a central processing unit, a readable/writable RAM (Random Access Memory) 5*b*, and a read-only ROM (Read Only Memory) 5*c*. Further, as the CPU 5*a* loads and executes a program stored in the ROM 5*c*, the program causes the computer composed of hardware such as the CPU to perform a robot control method.

The ceiling camera 7, the fastening-hole recognition camera 11*b*, the triple camera 12, and the trigger 13*a* are connected to the robot control unit 5 as input devices. A robot-arm controller 20, a nut-runner controller 21 and a display 6 are connected to the robot control unit 5 as output devices.

Further, an HDD 22 is connected to the robot control unit 5 as an external storage device. A component DB (DataBase) 23 and a traceability file 24 are stored in the HDD 22.

The robot-arm controller 20 controls the robot arm unit 10.

The nut-runner controller 21 controls the nut runner 13.

The component DB 23 includes a component identification DB 23*a* shown in FIG. 3 and a fastening condition DB 23*b* shown in FIG. 4.

As shown in FIG. 3, the component identification DB 23*a* includes component identification information in which feature vectors of images are associated with component numbers. The robot control unit 5 identifies the component number of the main-component 3 by taking an image of the main-component 3 using the ceiling camera 7, extracting feature vectors of the obtained image, and comparing the extracted feature vectors with those stored in the component identification DB 23*a*. The robot control unit 5 typically extracts feature vectors of an image by using an automatic encoder, but may extract other feature vectors such as SIFT feature vectors.

As shown in FIG. 4, the fastening condition DB 23*b* includes, for each component, fastening condition information in which a fastening hole number, coordinates, a permissible range, a torque, and a condition(s) are associated with each other. FIG. 4 shows fastening condition information for a component No. 8044214.

The fastening hole numbers are numbers assigned to the plurality of fastening holes 3*a* formed in the main-component 3. The fastening hole No. 1 corresponds to the sub-component 41 shown in FIG. 1. The fastening hole No. 2 corresponds to the sub-component 42; the fastening hole No. 3 corresponds to the sub-component 43; the fastening hole No. 4 corresponds to the sub-component 44; the fastening hole No. 5 corresponds to the sub-component 45; and the fastening hole No. 6 corresponds to the sub-component 46.

The coordinates are those of an initial position at which the tip of the socket 14 should be positioned when screw fastening is started in order to screw-fasten the sub-component 4 placed at the corresponding fastening hole. The permissible ranges are shown as permissible deviations from the initial positions and are shown inside parentheses in FIG. 4. Therefore, for example, when the sub-component 41 corresponding to the fastening hole No. 1 is attached to the main-component 3, the initial position at which the tip of the socket 14 should be positioned when the screw-fastening is started is as follows: the X-coordinate is 0.9 to 1.1; the Y-coordinate is 0.9 to 1.1; and the Z-coordinate is 0.9 to 1.1.

The torque means a specified torque that should be applied when a sub-component 4 placed in its corresponding fastening hole is screw-fastened. Therefore, for example, when the sub-component 41 corresponding to the fastening hole No. 1 is attached to the main-component 3, the specified torque is 30 Nm.

It should be noted that the fastening condition DB 23*b* may be fastening condition information in which, for each component, a fastening hole number, coordinates and a permissible range thereof, a torque, a rotation speed, and a condition(s) are associated with each other. Note that the rotation speed means a specified rotation speed used when the sub-component 4 placed in a fastening hole having a corresponding fastening hole number is screw-fastened.

The condition(s) means a fastening condition(s) under which a sub-component 4 should be screw-fastened to its corresponding fastening hole.

For example, in the case where the sub-component 4 rotates relative to the main-component 3 as the robot 2 tries to screw-fasten the sub-component 4 to the main-component 3, the operator needs to hold the sub-component 4 so that the sub-component 4 does not rotate when the robot 2 screw-fastens the sub-component 4 to the main-component 3. Therefore, the condition for the fastening hole for which its corresponding sub-component needs to be prevented from rotating by the operator is “Rotation”. In the example shown in FIG. 4, the conditions for the fastening hole No. 2 and No. 3 are both “Rotation”.

Further, for example, when the sub-component 4 is attached to the main-component 3, if the sub-component 4 is a component that needs to be screw-fastened to the main-component 3 in a state in which the component and another component are stacked on each other, i.e., if the sub-component 4 needs to be jointly fastened to the main-component 3 together with the other component, the operator needs to hold at least one or both of the sub-component 4 and the other component so that the stacked state of the sub-component 4 and the other component is maintained. Therefore, the condition for the fastening hole for which the stacked state of the sub-component 4 and the other component needs to be maintained by the operator is “Joint fastening”. In the example shown in FIG. 4, the condition for the fastening hole No. 5 is “Joint fastening”. As shown in FIG. 1, the sub-component 45 is jointly fastened to the main component together with the Y-shaped crimp terminal 17 of the wire harness 16.

Further, when the robot 2 can screw-fasten a sub-component 4 to the main-component 3 by itself without requiring cooperation of the operator, the condition for the fastening hole corresponding to that sub-component 4 is “Normal”. In the example shown in FIG. 4, all of the fastening hole No. 1, No. 4, and No. 6 are “Normal”.

FIG. 5 shows information stored in the traceability file 24. In the traceability file 24, fastening result information in which, for each component, a fastening hole number, coordinates, a torque, and success/failure are associated with each other is stored. FIG. 5 shows fastening result information for the component No. 8044214.

The coordinates are those of the initial position at which the tip of the socket 14 was positioned when screw fastening was started in order to screw-fasten the sub-component 4 placed at the fastening hole having the corresponding fastening hole number. Therefore, when the sub-component 41 corresponding to the fastening hole No. 1 was attached to the main-component 3, the initial position of the tip of the socket 14 when the screw fastening was started was as follows: the X-coordinate was 1.02; the Y-coordinate was 1.04; and the Z-coordinate was 0.97.

The torque means the actual fastening torque that was applied when the sub-component 4 placed in the corresponding fastening hole was screwed.

The success/failure means the success/failure of the screw fastening.

Next, a control flow of the robot control unit 5 will be described with reference to FIG. 6.

S100:

Firstly, the robot control unit 5 takes images of the main-component 3 from various directions by using the ceiling camera 7 and the fastening-hole recognition camera 11*b*. Note that the main-component 3 is preferably grasped by a conveyance robot (not shown) and positioned away from the worktable. Alternatively, images of the main-component 3 may be taken in a state in which the main-component 3 is placed on the worktable. The robot control unit 5 acquires the images output from the ceiling camera 7 and the fastening-hole recognition camera 11*b*.

S110:

Next, the robot control unit 5 identifies the component number of the main-component 3 by extracting feature vectors of the acquired images and comparing the extracted feature vectors with those stored in the component identification DB 23*a* of the component DB 23.

S120:

Next, the robot control unit 5 uses a variable i, whose initial value is 1, in order to perform a screw-fastening process for every fastening hole.

S130:

Next, the robot control unit 5 acquires coordinates, a permissible range, a torque, and a condition(s) of the fastening hole No. i by referring to the fastening condition DB 23*b*.

S140:

Next, the robot control unit 5 generates a moving path of the nut runner 13 along which the nut runner 13 needs to move to screw-fasten the sub-component 4 to the main-component 3 at the fastening hole No. i. The moving path can be calculated in accordance with inverse kinematics based on the current position of the nut runner 13 and the position at the destination of the nut runner 13.

S150:

Next, the robot control unit 5 determines whether or not the fastening condition for the fastening hole No. i is “Rotation” by referring to the fastening condition DB 23*b*. When the determination result is YES in the step S150, the robot control unit 5 advances the process to a flow shown in FIG. 7, whereas when it is NO in the step S150, the robot control unit 5 advances the process to a step S160.

S160:

Next, the robot control unit 5 determines whether or not the fastening condition for the fastening hole No. i is “Joint fastening” by referring to the fastening condition DB 23*b*. When the determination result is YES in the step S160, the robot control unit 5 advances the process to a flow shown in FIG. 9, whereas when it is NO in the step S160, the robot control unit 5 advances the process to a step S170.

S170:

Next, the robot control unit 5 takes images of the working environment around the nut runner 13 by using the ceiling camera 7 and the fastening-hole recognition camera 11*b*.

S180:

Next, the robot control unit 5 determines, based on the images output from the ceiling camera 7 and the fastening-hole recognition camera 11*b*, whether or not there is an obstacle in the moving path of the nut runner 13. When the determination result is YES in the step S180, the robot control unit 5 advances the process to a flow shown FIG. 11, whereas when it is NO in the step S180, the robot control unit 5 advances the process to a step S190.

S190:

Next, the robot control unit 5 presumes that the robot 2 can screw-fasten the sub-component 4 to the main-component 3 by itself at the fastening hole No. i without obtaining cooperation of the operator, and therefore screw-fastens the sub-component 4 to the main-component 3 at the fastening hole No. i by using the robot 2. In the example shown in FIGS. 1 and 4, at each of the fastening hole No. 1 and No. 4, the robot control unit 5 screw-fastens the sub-component 4 to the main-component 3 at that fastening hole No. i by using the robot 2 alone. That is, at each of the fastening hole No. 1 and No. 4, the robot 2 screw-fastens the sub-component 4 to the main-component 3 by itself without obtaining cooperation of the operator. Note that the robot 2 has preferably been trained in advance for details of the screw-fastening operation.

Further, the robot control unit 5 may control the robot 2 so that the robot 2 re-chucks a different nut runner 13 suitable for the specified torque corresponding to the fastening hole No. i. Similarly, the robot control unit 5 may control the robot 2 so that the robot 2 re-chucks a different socket 14 suitable for the shape of the bolt head of the bolt 15 corresponding to the fastening hole No. i.

S200:

Next, the robot control unit 5 records a result of the fastening in the traceability file 24 shown in FIG. 5.

S210:

Next, the robot control unit 5 calculates the progress of the fastening task and outputs the calculated progress to the display 6. The progress of the fastening task can be calculated, for example, by dividing the variable i by the total number imax of fastening holes and multiplying it by 100. In such a case, the progress of the fastening task is expressed in the form of a percentage.

However, instead of calculating the progress of the fastening task by using the variable i, the robot control unit 5 may calculate the progress of the fastening task by analyzing an image obtained from the ceiling camera 7 and thereby counting fastening holes to which corresponding sub-components have not been screw-fastened yet.

S220:

Next, the robot control unit 5 increments the variable i.

S230:

Next, the robot control unit 5 determines whether or not the variable i exceeds the total number imax of fastening holes. When the determination result is YES in the step S230, the robot control unit 5 finishes the process, whereas when it is NO in the step S230, the robot control unit 5 returns the process to the step S130.

(Prevention of Rotation)

Figure 6:
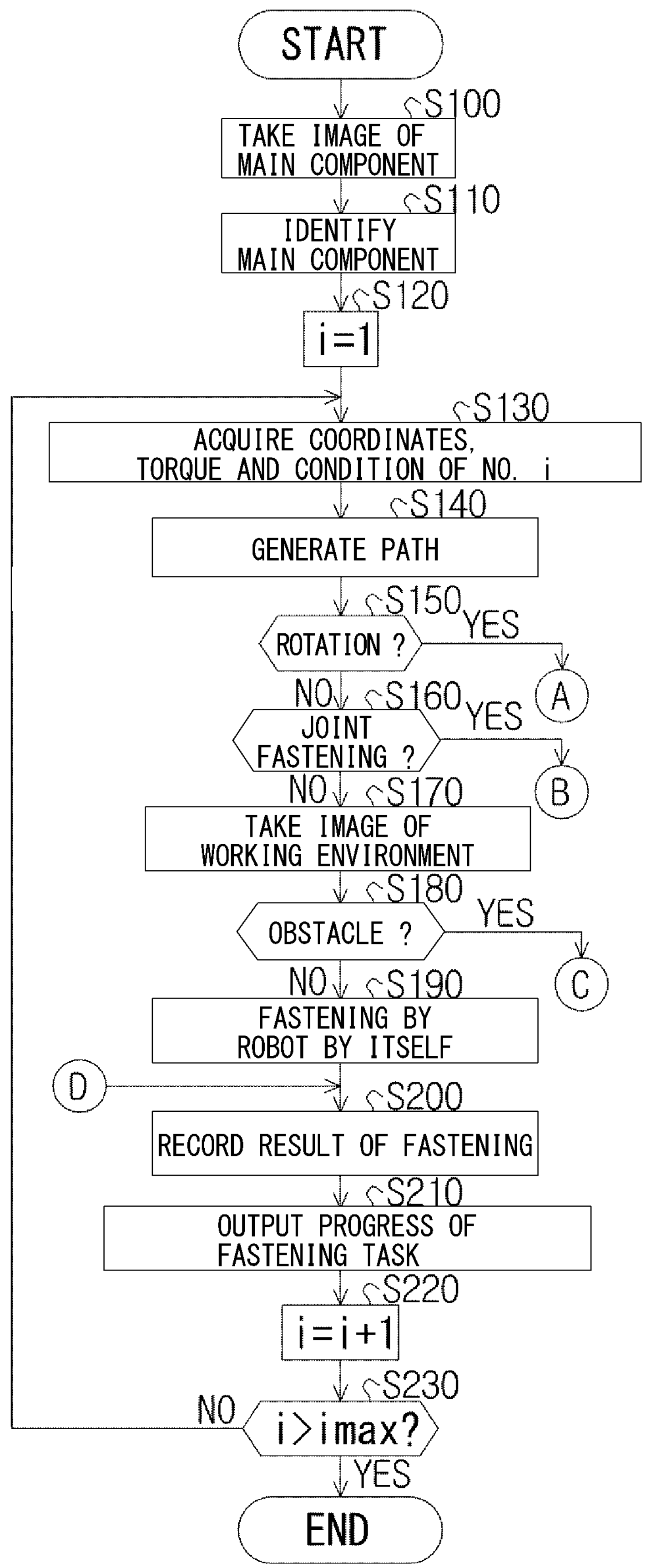
FIG. 6 shows a control flow of a robot control unit.
Figure 7:
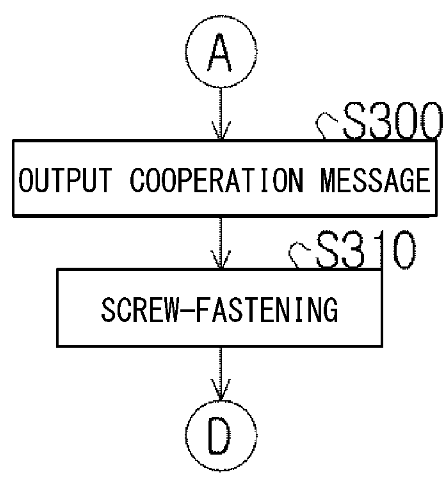
FIG. 7 is a control flow of the robot control unit.

Next, processes that are performed when the determination result in the step S150 in FIG. 6 is YES will be described with reference to FIGS. 7 and 8. In the example shown in FIG. 1 and FIG. 4, when the fastening hole to be processed is the fastening hole No. 2 or No. 3, the determination result becomes YES in the step S150.

S300:

Firstly, the robot control unit 5 outputs a cooperation message to the display 6. FIG. 8 shows a specific example of the cooperation message.

As shown in FIG. 8, the cooperation message includes a message indicating that the robot 2 cannot perform screw fastening by itself and cooperation of an operator is required.

The cooperation message further includes a procedure of the task to be performed by the operator.

Specifically, the cooperation message includes the fastening hole number of the fastening hole for which screw-fastening is to be performed at that moment. The cooperation message includes a message instructing the operator to hold the sub-component 4 so that the sub-component 4 does not rotate relative to the main-component 3 when the robot 2 screw-fastens the sub-component 4 to the main-component 3. In the case where a wire harness is attached to the sub-component 4, the cooperation message may be a message instructing the operator to hold the sub-component 4 and the wire harness so that the sub-component 4 does not rotate relative to the main-component 3 when the robot 2 screw-fastens the sub-component 4 to the main-component 3.

The cooperation message may also include a specified torque corresponding to the fastening hole number of the fastening hole for which screw-fastening is to be performed at that moment. The cooperation message may also include a type of tool to be used by the operator, the order of fastening, and the required quality of the screw fastening.

S310:

Next, the robot control unit 5 performs screw fastening five seconds after outputting the cooperation message to the display 6. Then, the robot control unit 5 advances the process to a step S200 in FIG. 6.

As described above, the robot control unit 5 determines that the robot 2 cannot screw-fasten the sub-component 4 to the main-component 3 by itself when the sub-component 4 rotates relative to the main-component 3 as the robot 2 tries to screw-fasten the sub-component 4 to the main-component 3 by itself. Therefore, the robot control unit 5 outputs a cooperation message instructing the operator holds the sub-component 4 so that the sub-component 4 does not rotate relative to the main-component 3 when the robot 2 screw-fastens the sub-component 4 to the main-component 3. Therefore, when the sub-component 4 is attached to the main-component 3, even if the sub-component 4 is not restrained from rotating relative to the main-component 3 though the direction in which the sub-component 4 should be attached is specified, it is possible to attach the sub-component 4 to the main-component 3 in the desired attaching direction as the operator cooperates with the robot 2.

Note that the waiting time from when the robot control unit 5 outputs the cooperation message to when the screw fastening is actually performed is arbitrarily determined. For example, the waiting time may be three seconds or ten seconds depending on the skillfulness of the operator.

(Joint Fastening)

Figure 9:
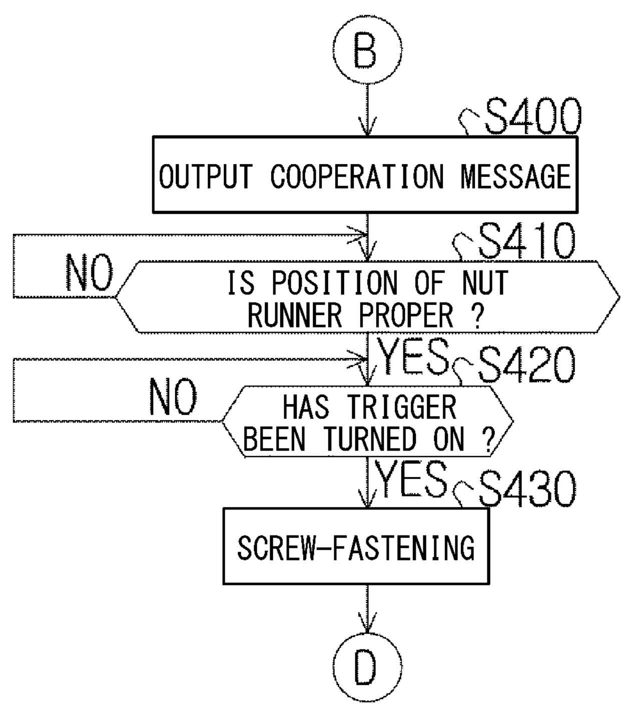
FIG. 9 shows a control flow of a robot control unit.

Next, processes that are performed when the determination result in step the S160 in FIG. 6 is YES will be described with reference to FIGS. 9 and 10. In the example shown in FIGS. 1 and 4, when the fastening hole to be processed is the fastening hole No. 5, the determination result becomes YES in the step S160.

S400:

Firstly, the robot control unit 5 outputs a cooperation message to the display 6. FIG. 10 shows a specific example of the cooperation message.

As shown in FIG. 10, the cooperation message includes a message indicating that the robot 2 cannot perform screw fastening by itself and cooperation of an operator is required.

The cooperation message further includes a procedure of the task to be performed by the operator.

Specifically, the cooperation message includes the fastening hole number of the fastening hole for which screw-fastening is to be performed at that moment. The cooperation message includes a message instructing the operator to hold the sub-component 4 and another component so that they are kept in a state in which the sub-component 4 and the other component are stacked on each other when the robot 2 screw-fastens the sub-component 4 to the main-component 3. In the example shown in FIGS. 1 and 10, the other component is a Y-shaped crimp terminal 17 of a wire harness 16. As shown in FIG. 10, the cooperation message further includes a message instructing the operator to move the nut runner 13 to a position suitable for the robot 2 to screw-fasten the sub-component 4 to the main-component 3. Further, as shown in FIG. 10, the cooperation message further includes a message instructing the operator to operate the trigger 13*a* after moving the nut runner 13 to the suitable position.

S410:

Next, the robot control unit 5 determines whether, as a result of the movement of the nut runner 13 by the operator, the tip of the socket 14 has moved to the proper position by referring to the fastening condition DB 23*b*. When the determination result is NO in the step S410, the robot control unit 5 repeats the step S410, whereas when the determination result is YES in the step S410, the robot control unit 5 advances the process to a step S420.

S420:

Next, the robot control unit 5 determines whether or not the trigger 13*a* has been operated. When the determination result is NO in the step S420, the robot control unit 5 repeats the step S420, whereas when the determination result is YES in the step S420, the robot control unit 5 advances the process to a step S430.

S430:

Next, the robot control unit 5 performs screw fastening. Then, the robot control unit 5 advances the process to a step S200 in FIG. 6.

As described above, the robot control unit 5 determines that the robot 2 cannot screw-fasten the sub-component 4 to the main-component 3 by itself when the sub-component 4 is a component that needs to be screw-fastened to the main-component 3 in a state in which the component and another component are stacked on each other. Therefore, the robot control unit 5 outputs a cooperation message instructing the operator holds the sub-component 4 and the other component so that the sub-component 4 is kept in the state in which the sub-component 4 and the other component are stacked on each other when the robot 2 screw-fastens the sub-component 4 to the main-component 3. Therefore, when the sub-component 4 is attached to the main-component 3, even if the sub-component 4 needs to be screw-fastened to the main-component 3 in a state in which the sub-component 4 and another component are stacked on each other but the other component cannot be kept standstill in the proper position relative to the sub-component 4, it is possible to attach the sub-component 4 to the main-component 3 in the state in which the sub-component 4 and the other component are stacked on each other as the operator cooperates with the robot 2.

(Obstacle)

Figure 11:
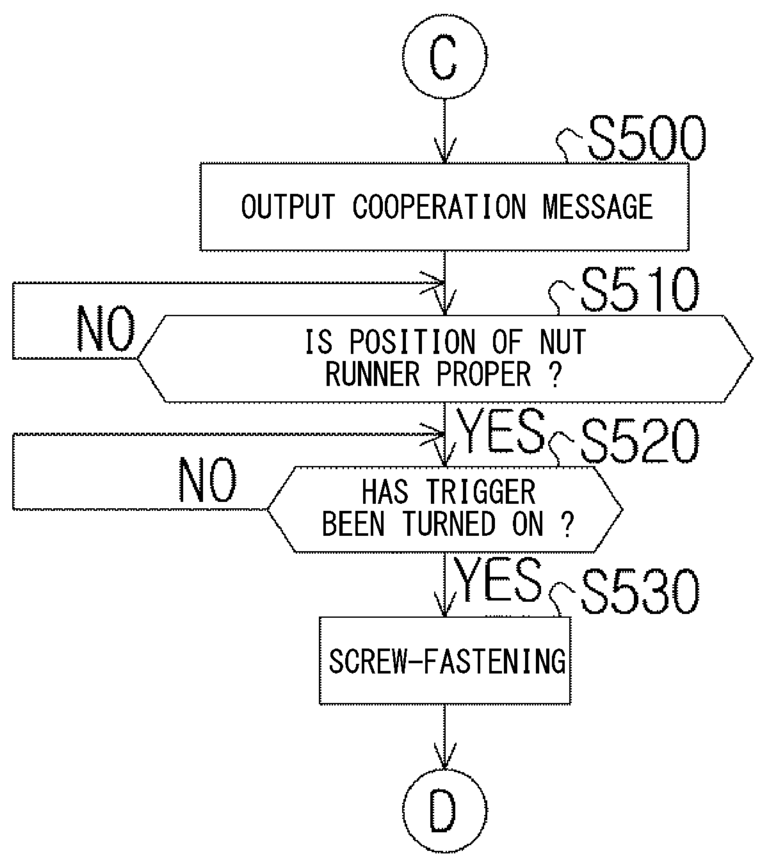
FIG. 11 shows a control flow of a robot control unit.

Next, processes that are performed when the determination result in the step S180 in FIG. 6 is YES will be described with reference to FIGS. 11 and 12. In the example shown in FIG. 1 and FIG. 4, when the fastening hole to be processed is the fastening hole No. 6, the determination result becomes YES in the step S180. As shown in FIG. 1, there is a wire harness 16 connected to the sub-component 45 directly above the sub-component 46 corresponding to the fastening hole No. 6, and the fastening hole 4*a* for the sub-component 46 is covered (i.e., blocked) by the wire harness 16.

S500:

Firstly, the robot control unit 5 outputs a cooperation message to the display 6. FIG. 12 shows a specific example of the cooperation message.

As shown in FIG. 12, the cooperation message includes a message indicating that the robot 2 cannot perform screw fastening by itself and cooperation of an operator is required.

The cooperation message further includes a procedure of the task to be performed by the operator.

Specifically, the cooperation message includes the fastening hole number of the fastening hole for which screw-fastening is to be performed at that moment. The cooperation message includes a message instructing the operator to remove the obstacle from the moving path of the nut runner 13 and to move the nut runner 13 to a position suitable for the robot 2 to screw-fasten the sub-component 4 to the main-component 3. In the example shown in FIGS. 1 and 12, the obstacle is the wire harness 16. Further, as shown in FIG. 12, the cooperation message further includes a message instructing the operator to operate the trigger 13*a* after moving the nut runner 13 to the proper position.

S510:

Next, the robot control unit 5 determines whether, as a result of the movement of the nut runner 13 by the operator, the tip of the socket 14 has moved to the proper position by referring to the fastening condition DB 23*b*. When the determination result is NO in the step S510, the robot control unit 5 repeats the step S510, whereas when the determination result is YES in the step S510, the robot control unit 5 advances the process to a step S520.

S520:

Next, the robot control unit 5 determines whether or not the trigger 13*a* has been operated. When the determination result is NO in the step S520, the robot control unit 5 repeats the step S520, whereas when the determination result is YES in the step S520, the robot control unit 5 advances the process to a step S530. S530:

Next, the robot control unit 5 performs screw fastening. Then, the robot control unit 5 advances the process to a step S200 in FIG. 6.

As described above, the robot control unit 5 determines whether or not there is an obstacle in the moving path of the nut runner 13 based on images output from the ceiling camera 7 and the fastening-hole recognition camera 11*b*. Then, when the robot control unit 5 determines that there is an obstacle in the moving path, it determines that the robot 2 cannot screw-fasten the main-component 3 to the sub-component 4 by itself, and outputs a cooperation message instructing the operator to remove the obstacle from the moving path and to move the nut runner 13 to a position suitable for the robot 2 to screw-fasten the sub-component 4 to the main-component 3. Therefore, when the sub-component 4 is attached to the main-component 3, even if the nut runner 13 cannot move toward the sub-component 4 due to the presence of an obstacle in the moving path of the nut runner 13, it is possible to enable the nut runner 13 to move toward the sub-component 4 as the operator cooperates with the robot 2.

Preferred embodiments according to the present disclosure have been described above, and the above-described embodiments have the following features.

The robot control system 1 includes the robot 2 that screw-fastens a sub-component 4 placed in a main-component 3 to the main-component 3, the robot control unit 5 that controls the robot 2, and the display 6 that serves as an output unit through which the robot control unit 5 outputs a message to an operator. The robot control unit 5 determines whether or not the robot 2 can screw-fasten the sub-component 4 to the main-component 3 by itself. Then, when the robot control unit 5 determines that the robot 2 cannot screw-fasten the sub-component 4 to the main-component 3 by itself, the robot control unit 5 outputs a cooperation message to an operator through the display 6. When the robot control unit 5 determines that the robot 2 can screw-fasten the sub-component 4 to the main-component 3 by itself, the robot control unit 5 controls, without outputting the cooperation message, the robot 2 so that the robot 2 screw-fastens the sub-component 4 to the main-component 3 by itself. According to the above-described configuration, the robot 2, which performs the screw-fastening task, is complemented for its strong points and weak points.

The robot control unit 5 determines that the robot 2 cannot screw-fasten the sub-component 4 to the main-component 3 by itself when the sub-component 4 rotates relative to the main-component 3 as the robot 2 tries to screw-fasten the sub-component 4 to the main-component 3 by itself. According to the above-described configuration, when the sub-component 4 rotates relative to the main-component 3 as the robot 2 tries to screw-fasten the sub-component 4 to the main-component 3 by itself, a cooperation message is output.

The cooperation message is a message instructing the operator to hold the sub-component 4 so that the sub-component 4 does not rotate relative to the main-component 3 when the robot 2 screw-fastens the sub-component 4 to the main-component 3. According to the above-described configuration, a cooperation message that can be easily understood is realized.

The robot control unit 5 determines that the robot 2 cannot screw-fasten the sub-component 4 to the main-component 3 by itself when the sub-component 4 is a component that needs to be screw-fastened to the main-component 3 in a state in which the component and another component are stacked on each other. According to the above-described configuration, when the sub-component 4 is a component that needs to be screw-fastened to the main-component 3 in a state in which the component and another component are stacked on each other, a cooperation message is output.

The cooperation message is a message instructing the operator to hold the sub-component 4 and the other component so that the sub-component 4 is kept in the state in which the sub-component 4 and the other component are stacked on each other when the robot 2 screw-fastens the sub-component 4 to the main-component 3. According to the above-described configuration, a cooperation message that can be easily understood is realized.

One of the sub-component 4 and the other component is a terminal.

The robot 2 includes the nut runner 13 and the robot arm unit 10 which serves as a robot arm that supports the nut runner 13, and the robot control system 1 further includes the ceiling camera 7 which serves as a camera that takes an image of the working environment around the robot 2. The robot control unit 5 calculates a moving path of the nut runner 13 along which the nut runner 13 moves when the sub-component 4 is screw-fastened to the main-component 3, determines whether or not there is an obstacle in the moving path based on an image output from the ceiling camera 7. Then, when the robot control unit 5 determines that there is an obstacle in the moving path, it determines that the robot 2 cannot screw-fasten the sub-component 4 to the main-component 3 by itself. According to the above-described configuration, when the robot control unit 5 determines that there is an obstacle in the moving path, a cooperation message is output.

The cooperation message is a message instructing the operator to remove an obstacle and move the nut runner 13 to a position suitable for the robot 2 to screw-fasten the sub-component 4 to the main-component 3. According to the above-described configuration, a cooperation message that can be easily understood is realized.

The obstacle is the wire harness.

In the robot control method, it is determined whether or not the robot 2, which is configured to screw-fasten a sub-component 4 disposed in a main component 3 to the main-component 3, can screw-fasten the sub-component 4 to the main-component 3 by itself, and when it is determined that the robot 2 cannot screw-fasten the sub-component 4 to the main-component 3 by itself, a cooperation message is output to an operator (S300, S400 and S500). Further, when it is determined that the robot 2 can screw-fasten the sub-component 4 to the main-component 3 by itself, the robot 2 is, without outputting the cooperation message, controlled so that the robot 2 screw-fastens the sub-component 4 to the main-component 3 by itself (S190). According to the above method, the robot 2, which performs the screw-fastening task, is complemented for its strong points and weak points.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot control system comprising:

a robot configured to screw-fasten a second component disposed in a first component to the first component;

a robot control unit configured to control the robot; and an output unit through which the robot control unit outputs a message to an operator, wherein the robot control unit determines whether or not the robot is able to screw-fasten the second component to the first component by itself, when the robot control unit determines that the robot is not able to screw-fasten the second component to the first component by itself, the robot control unit outputs a cooperation message to the operator through the output unit, when the robot control unit determines that the robot is able to screw-fasten the second component to the first component by itself, the robot control unit controls, without outputting the cooperation message, the robot so that the robot screw-fastens the second component to the first component by itself, and wherein the robot control unit determines that the robot is not able to screw-fasten the second component to the first component by itself when the second component rotates relative to the first component as the robot tries to screw-fasten the second component to the first component by itself.

2. The robot control system according to claim 1, wherein the cooperation message is a message instructing the operator to hold, when the robot screw-fastens the second component to the first component, the second component so that the second component does not rotate relative to the first component.

3. A robot control system comprising:

a robot configured to screw-fasten a second component disposed in a first component to the first component;

a robot control unit configured to control the robot; and an output unit through which the robot control unit outputs a message to an operator, wherein the robot control unit determines whether or not the robot is able to screw-fasten the second component to the first component by itself, when the robot control unit determines that the robot is not able to screw-fasten the second component to the first component by itself, the robot control unit outputs a cooperation message to the operator through the output unit, when the robot control unit determines that the robot is able to screw-fasten the second component to the first component by itself, the robot control unit controls, without outputting the cooperation message, the robot so that the robot screw-fastens the second component to the first component by itself, and wherein the robot control unit determines that the robot is not able to screw-fasten the second component to the first component by itself when the second component is a component that needs to be screw-fastened to the first component in a state in which the second component and another component are stacked on each other.

4. The robot control system according to claim 3, wherein the cooperation message is a message instructing the operator to hold, when the robot screw-fastens the second component to the first component, the second component and the other component so that the second component is kept in the state in which the second component and the other component are stacked on each other.

5. The robot control system according to claim 3, wherein one of the second component and the other component is a terminal.

6. A robot control system comprising:

a robot configured to screw-fasten a second component disposed in a first component to the first component;

a robot control unit configured to control the robot; and an output unit through which the robot control unit outputs a message to an operator, wherein the robot control unit determines whether or not the robot is able to screw-fasten the second component to the first component by itself, when the robot control unit determines that the robot is not able to screw-fasten the second component to the first component by itself, the robot control unit outputs a cooperation message to the operator through the output unit, when the robot control unit determines that the robot is able to screw-fasten the second component to the first component by itself, the robot control unit controls, without outputting the cooperation message, the robot so that the robot screw-fastens the second component to the first component by itself, the robot comprises a nut runner and a robot arm configured to support the nut runner, the robot control system further comprises a camera configured to take an image of a working environment around the robot, the robot control unit calculates a moving path of the nut runner along which the nut runner moves when the second component is screw-fastened to the first component, the robot control unit determines whether or not there is an obstacle in the moving path based on an image output from the camera, when the robot control unit determines that there is an obstacle in the moving path, the robot control unit determines that the robot is not able to screw-fasten the second component to the first component by itself, and wherein the cooperation message is a message instructing the operator to remove the obstacle and to move the nut runner to a place suitable for the robot to screw-fasten the second component to the first component.

7. A robot control system comprising:

a robot configured to screw-fasten a second component disposed in a first component to the first component;

a robot control unit configured to control the robot; and an output unit through which the robot control unit outputs a message to an operator, wherein the robot control unit determines whether or not the robot is able to screw-fasten the second component to the first component by itself, when the robot control unit determines that the robot is not able to screw-fasten the second component to the first component by itself, the robot control unit outputs a cooperation message to the operator through the output unit, when the robot control unit determines that the robot is able to screw-fasten the second component to the first component by itself, the robot control unit controls, without outputting the cooperation message, the robot so that the robot screw-fastens the second component to the first component by itself, the robot comprises a nut runner and a robot arm configured to support the nut runner, the robot control system further comprises a camera configured to take an image of a working environment around the robot, the robot control unit calculates a moving path of the nut runner along which the nut runner moves when the second component is screw-fastened to the first component, the robot control unit determines whether or not there is an obstacle in the moving path based on an image output from the camera, when the robot control unit determines that there is an obstacle in the moving path, the robot control unit determines that the robot is not able to screw-fasten the second component to the first component by itself, and wherein the obstacle is a wire harness.

* * * * *